Figure 1:
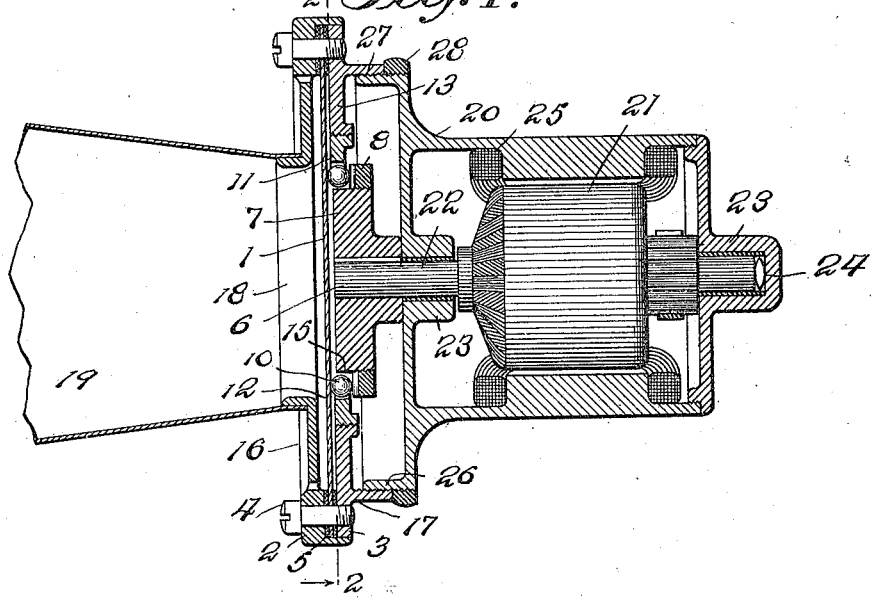

G. C. DEAN.
MECHANICAL HORN.
APPLICATION FILED JULY 10, 1911.

1,148,294.

Patented July 27, 1915.
4 SHEETS—SHEET 1.

WITNESSES:
Chas. F. Clagett

INVENTOR
George C. Dean

G. C. DEAN.
MECHANICAL HORN.
APPLICATION FILED JULY 10, 1911.
1,148,294.
Patented July 27, 1915.
4 SHEETS—SHEET 2.
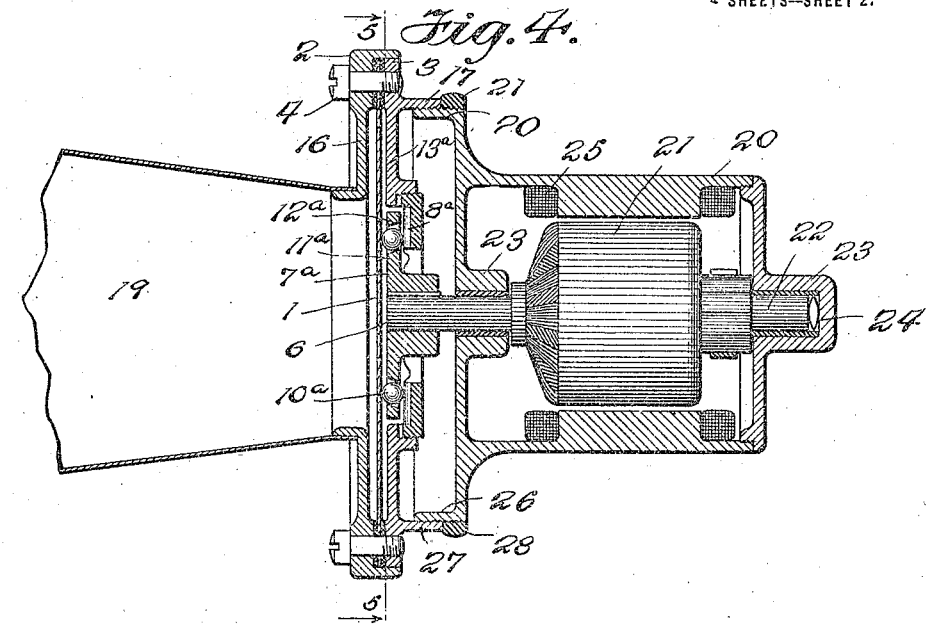
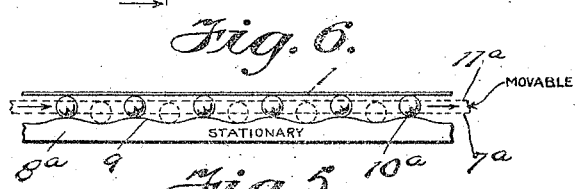
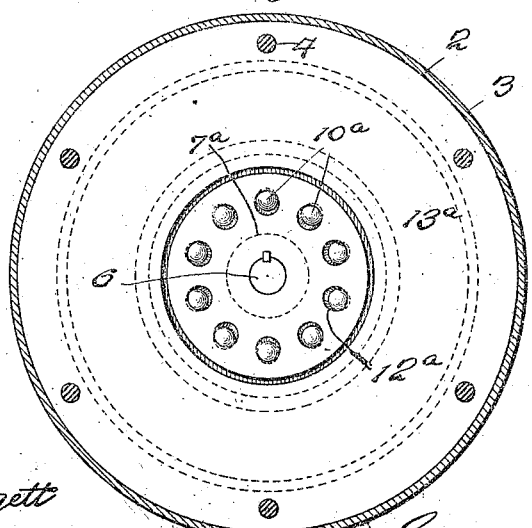
WITNESSES:
INVENTOR

G. C. DEAN.
MECHANICAL HORN.
APPLICATION FILED JULY 10, 1911.

1,148,294.

Patented July 27, 1915.
4 SHEETS—SHEET 3.

WITNESSES:
Chas. F. Clagett

INVENTOR
G. C. Dean

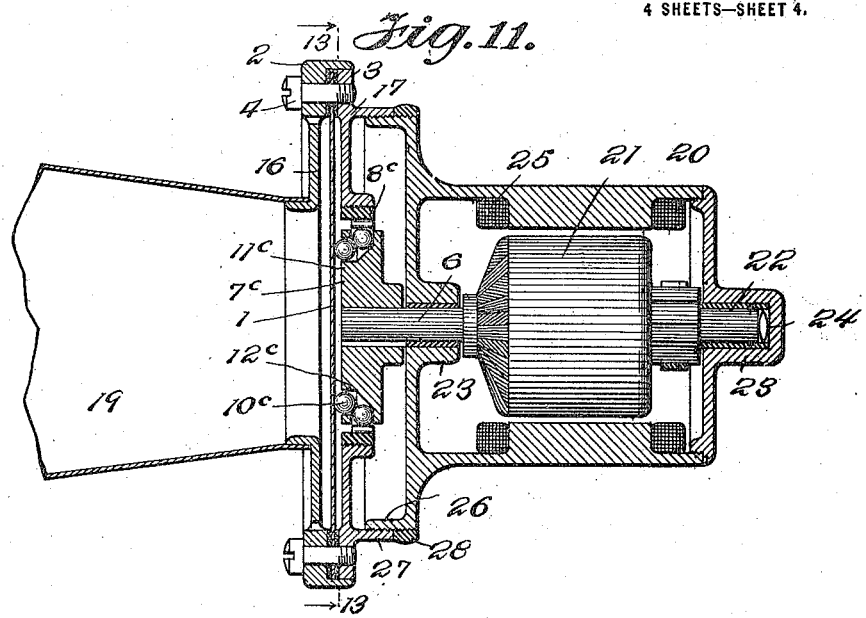
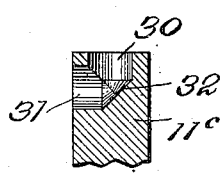
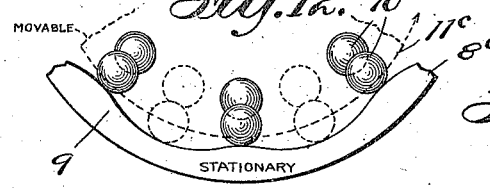
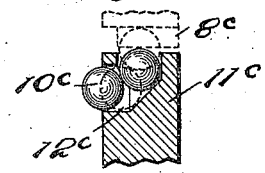
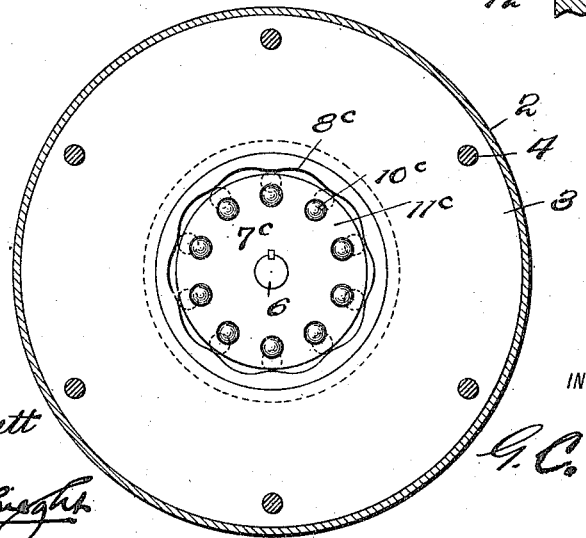

UNITED STATES PATENT OFFICE.

GEORGE C. DEAN, OF BRONXVILLE, NEW YORK, ASSIGNOR, BY MESNE ASSIGNMENTS, TO LOVELL-McCONNELL MANUFACTURING COMPANY, A CORPORATION OF DELAWARE.

MECHANICAL HORN.

1,148,294.  Specification of Letters Patent.  Patented July 27, 1915.

Application filed July 10, 1911. Serial No. 637,678.

*To all whom it may concern:*

Be it known that I, GEORGE COOPER DEAN, a citizen of the United States, and resident of Bronxville, Westchester county, New York, have invented certain new and useful Improvements in Mechanical Horns, of which the following is a specification.

This invention relates to mechanically-actuated diaphragm signal or alarm devices, usually embodying a horn serving as a projector or resonator or both. In such signals the diaphragm is actuated by a rotary member or shaft, which is driven by power means, usually an electric motor, through suitable connections or instrumentalities capable of converting the rotary movement of the driver into reciprocatory movement of the diaphragm. The diaphragm being elastic, vibration may be set up and maintained by repeatedly displacing it in either direction from normal, since such displacements will put it under elastic stress causing it to return to or past normal position upon cessation of the displacing effort. Or the diaphragm may be displaced in both directions. In some cases the driving shaft or rotary member is provided with one or more eccentric portions or projections, constituting it a cam or series of cams, the path of which is intercepted by a projection carried by the diaphragm. In other cases a separate thrust connection or a freely vibrated part has been interposed between the cam and the diaphragm. Where a simple cam tooth or projection on the rotary driver contacts with a projection on the diaphragm, the scraping of one part on the other entails more or less wear and loss of power and has an effect on the sound which is undesirable for certain purposes. Moreover, the thrust has more or less lateral component, tending to twist or rotate the diaphragm; and the effort is applied at one region, usually the center, so that a definite limitation is imposed as to the maximum size of diaphragm that will vibrate in a bodily and unitary manner in response to the thrusts.

In the present invention I employ as diaphragm displacing members a series of balls, preferably mounted in guides for forward and backward movement. These balls, of which there are two or more, are disposed about the axis of the diaphragm so as to contact therewith at points between its center and virtual periphery. They are preferably adapted to be actuated simultaneously, thereby securing a distribution of thrust about and distant from the diaphragm center, so that a diaphragm of large diameter may be vibrated in a perfectly unitary manner even though relatively thin and flexible. Moreover, these distributed thrusts are, from the nature of the thrust elements, perfectly normal to the diaphragm, which may be entirely plane and imperforate.

The balls moving back and forth in their guides may be regarded as a species of pistons. These pistons may reciprocate in place, in which event the cam, preferably a face cam, is rotated so as to travel in contact with the balls to force the latter successively toward or against the diaphragm; or they may reciprocate when traveling in an orbit, in which case the member having the guides will be rotated to carry the balls over a stationary cam. In other words, means, in the nature of the rotary driver or actuator, is provided for producing relative rotation between the cam and the series of balls.

A single series of balls may be interposed between the cam or forcing means and the diaphragm, but inasmuch as this construction necessitates a considerable amount of sliding action of the balls on the parts with which they are in contact, friction and its attendant evils may be further reduced by utilizing a compound thrust element consisting of two or more balls, one behind the other, in place of each single ball. Thus, with two balls, one ball contacts with the cam and may roll thereon while the other ball may roll on the diaphragm, the slip being confined to the point where the two balls touch each other.

Preferably means are provided for constantly and yieldingly pressing or urging the balls away from the diaphragm or against the cam, during running. This provision makes it possible to secure very material advantages. In the first place, the weight of the balls or thrust members is taken off the diaphragm, so that the latter is entirely unweighted; and furthermore the behavior of the balls is rendered dependable, because they are normally maintained at one extreme of their reciprocatory movement. It will be obvious that means for causing a force to act constantly on the thrust members in a direction away from the diaphragm will be of advantage in instances where they are of a character other than balls, or where they do not reciprocate, or where they are supported by backing means other than a cam. In those cases where the balls are caused by the rotary driving means to travel in an orbit, as around the axis of the diaphragm, such means may be conveniently provided by constructing the guide openings or recesses holding the balls in such a manner that the thrust members are acted on by centrifugal force, in a direction away from the diaphragm or toward the cam.

The cam may be a face cam facing the diaphragm or it may be otherwise formed. When a face cam is employed I provide means for adjusting both the guide member and the cam toward and from the diaphragm, and preferably the means for adjusting the two parts are independent of each other, so that, at any adjustment, the balls, their guides, the diaphragm and the cam may be positioned in the best relation.

While the balls have been referred to as thrust elements, it will be clear that they may actuate the diaphragm by impact, being thrown by the cam more or less freely against the diaphragm. With the cam adjusted or set away from the diaphragm so that the balls when resting in the hollows of the cam are spaced away from the diaphragm by a distance equal to or greater than the throw of the cam, and with a sufficiently steep inclination to the cam-face or sufficient speed of rotation or both, the balls will be thrown forcibly against the diaphragm and may entirely clear the crests of the cams. Particularly when a large number of balls are used encircling the center of the diaphragm, so that an annular volley of blows, as it were is delivered, this mode of actuation may be very satisfactory. It has the advantage that there will be little likelihood of the diaphragm on its return swing being checked by positively supported balls.

Figure 3:
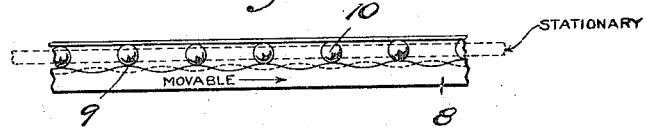
Figure 2:
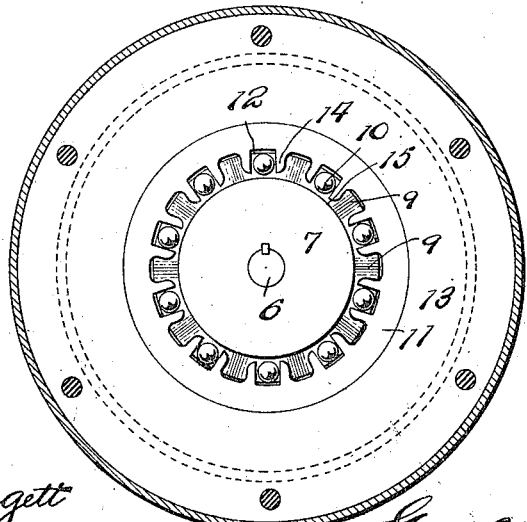
Figure 7:
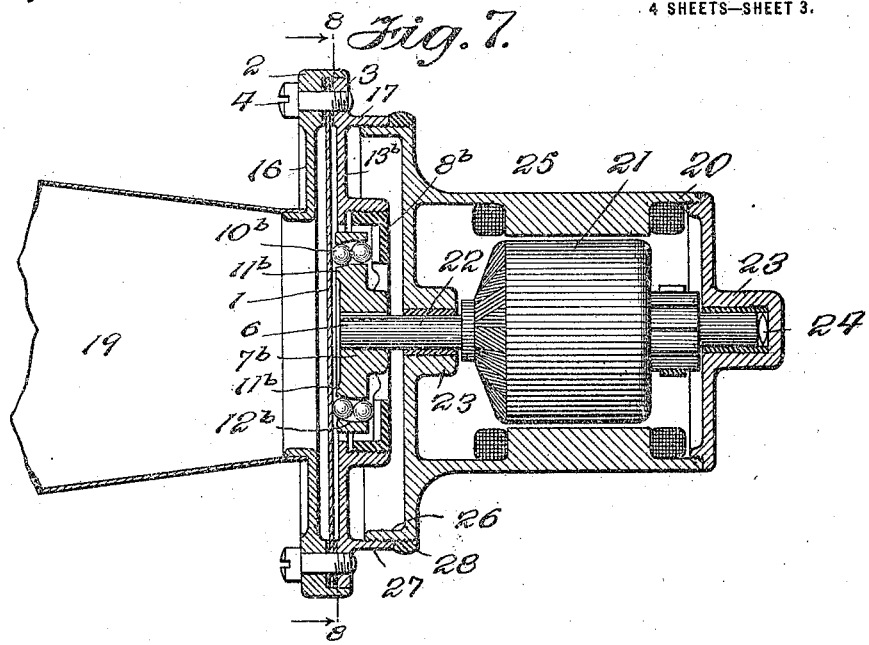
Figure 9:
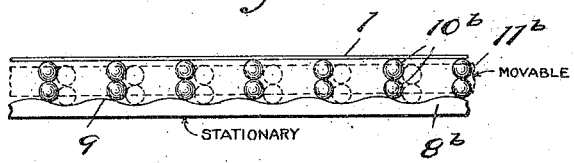
Figure 10:
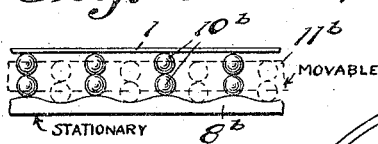
Figure 8:
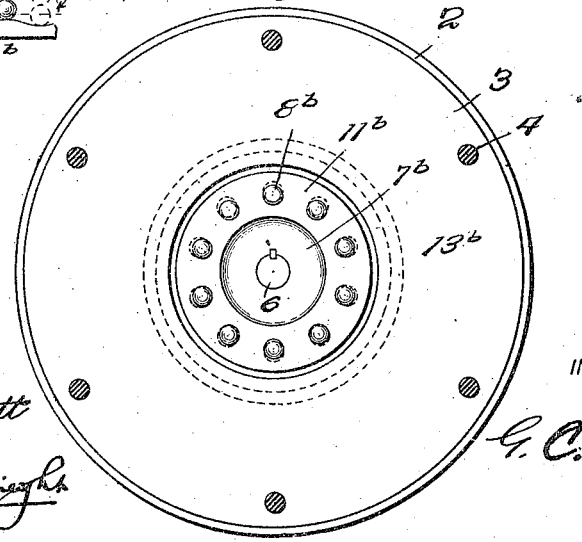

In the accompanying drawings illustrating certain of the preferred embodiments of the invention: Figure 1 is a vertical longitudinal section through a horn signal, the horn being broken away; Fig. 2 is a section on the line 2—2 of Fig. 1; Fig. 3 is a semi-diagrammatic view showing the relation between the cam, the diaphragm, the balls and their guide member; Fig. 4 is a view similar to Fig. 1, showing another embodiment of the invention; Fig. 5 is a section on the line 5—5 of Fig. 4; Fig. 6 is a view like Fig. 3 showing the relation of the parts in this form of the invention; Fig. 7 is a view corresponding to Fig. 1, showing another embodiment of the invention; Fig. 8 is a section on the line 8—8 of Fig. 7; Fig. 9 is a semi-diagrammatic view on the order of Fig. 2, illustrating the relations in this form of the invention; Fig. 10 is a similar view showing a different relation; Fig. 11 is a view corresponding to Fig. 1 showing another embodiment of the invention; Fig. 12 is a semi-diagrammatic view showing the relation between the cam, the balls and their movable retainer in this form of the invention; Fig. 13 is a section on the line 13—13 of Fig. 11; Fig. 14 is a sectional detail showing an angular pocket for the reception of two balls constituting a compound thrust element; and Fig. 15 is a similar view showing the balls in place and indicating the cam and changed positions of the balls by dotted lines.

Reference will first be had to Figs. 1 to 3, though much of the description will be applicable to the remaining figures, since certain features are common to all the forms. 1 indicates the diaphragm which is preferably held at its marginal regions by clamps 2, 3, secured together by bolts or screws 4, and holding the diaphragm between gaskets 5, of cork or other suitable material. 6 is the drive shaft disposed normal to the diaphragm, preferably at the center thereof. 7 is a suitable head or enlargement secured to or formed on the forward part of the shaft adjacent the diaphragm. 8 is a cam provided with a series of projections 9. 10 is a series of balls interposed between the cam and the diaphragm. 11 is a guide member or holder for the balls, having guide openings 12 formed therethrough for the reception of the balls. In this particular construction the guide member 11 is stationary and the cam 8 is the member which is rotated by the rotary driver 6, 7. In this instance the cam is a rotary face cam. The specific construction may be considerably varied. In the particular form illustrated the cam 8 is formed separately from the head 7 and secured thereto by screwing or otherwise; and the holder or guide member 11 is a ring screwed or otherwise adjustably secured to a stationary flange or support 13. It will be obvious that the member 11 might be extended entirely across the face of the head 7, in which event the openings 12 would be inclosed on all sides; but certain desirable results may be secured by making the member 11 in the form of a ring, provided with internally-projecting fingers 14 which form the openings 12, these openings being uninclosed at their inner sides, which are opposite a peripheral surface 15 on the head, the spacing being such that the balls may contact with this peripheral surface without escaping from the opening 12, and in this way be constantly agitated by the rotor. The surface 15 may be regarded as a peripheral shoulder on the head, and the cam member as a radially projecting flange in rear of this shoulder and behind the retaining member 11.

In operation the parts 6, 7 are rotated at high speed, preferably by power means, so that the cam member 8 is carried around behind the balls to force the latter repeatedly toward and against the diaphragm. The latter is entirely plane and imperforate inside its virtual periphery, that is, the inner circle of its clamped portion, and the balls are caused to deliver perfectly normal thrusts distributed simultaneously about and distant from its axis. In this way even a large diaphragm may be vibrated in a unitary manner, and without any lateral component of thrust, so that the diaphragm is placed under the least possible strain and the similarity of successive of the sound waves is not impaired. Since the amplitude of vibration at the regions of thrust is materially less than the complete amplitude of vibration at the center of the diaphragm, balls may be employed with advantage, even though of small diameter, since the extent of their reciprocatory movement is slight. For this reason their guide openings 12 may be of the simplest formation, without the necessity of providing them with means for holding the balls against escape at either end, the presence of the cam and the diaphragm being sufficient to insure the retention of the balls. The cam 8 may be adjusted toward and from the diaphragm, either by adjusting the head 7 by a construction which will be presently described, or by screwing the cam forward or backward on the head. The retaining member 11 may be adjusted between the cam and the diaphragm, by screwing it forward or backward on the support 13. The pitch of the screw threads may be low, so that very fine adjustments may be secured.

The nature of the power means for rotating the driver or actuator, the casing structure, and the resonator or projector may be widely varied. I have shown the clamps 2, 3, formed on front and rear sections 16 and 17 of the diaphragm case part, the front part of which is formed with a sound-escape opening 18, from which extends a suitable projector or resonator 19. The support 13 may be formed on or secured to the rear section 17. The rotary driver is preferably operated by an electric motor contained in a motor case part 20. The motor may be of any suitable or usual construction.

The armature is indicated at 21, its shaft 22 being journaled in suitable bearings 23 in the motor case part, and a thrust bearing 24 being provided at the rear end of the shaft. The field 25 may be suitably secured to the walls of the case. Preferably the shaft 6 is an extension of the armature shaft or directly connected therewith. Adjustment between the head 7 and the diaphragm is conveniently provided by rendering the motor case part 20 adjustable with reference to the rear section 17 of the diaphragm case part, to which end the motor case part may be provided with a flange 26 having threaded engagement with a flange 27 on the section 17, a lock nut 28 being provided for holding the parts to their adjustment.

In Figs. 4 to 6 the cam member $8^a$ is the stationary member, but is otherwise similar to the cam 8, and the ball-holding member $11^a$ is rotated by the shaft 6, by being secured to or formed on the head $7^a$. It follows that the balls $10^a$, instead of being reciprocated in place, are reciprocated while being caused to travel in an orbit about the axis of rotation, which is preferably coincident with the axis of the diaphragm. The specific construction may be considerably varied. In the form illustrated the cam member $8^a$ is a ring screwed onto a stationary supporting flange $13^a$ so that the cam may be adjusted toward and from the diaphragm. The ball-guiding member $11^a$ is disposed between the cam and the diaphragm as in the preceding instance. The guiding or retaining openings $12^a$ are preferably inclosed on all sides, though being entirely open at front and rear. This form of the invention illustrates an embodiment of means whereby the balls or thrust members are normally acted upon by the force tending to urge or press them away from the diaphragm and against the cam. In accordance with a simple embodiment of such means the walls of the openings $12^a$ are inclined outward and rearward, so that, during running, centrifugal force constantly and yieldingly urges the balls rearward. Features not specifically described are similar to those shown and described and similarly numbered in the preceding form of the invention.

In operation rotation of the retaining or guiding member $11^a$, which is here shown as a part of the head $7^a$, carries the balls around the axis of the diaphragm and up and down over the crests and hollows of the cam $8^a$. Centrifugal force constantly urges the balls away from the diaphragm and toward the cam, so that the balls are alternately thrust forward against the diaphragm by cam action, and retired by centrifugal force, or by the diaphragm or by both. The constant rearward urging of the balls insures that they will coöperate in a reliable manner with the cam, and has the further and very material advantage that the weight of the balls or thrust members is taken off the diaphragm at the termination of the thrusts, so that the diaphragm is entirely unweighted and may perform its elastic return movements to best advantage. It follows, also, from the fact that the balls are normally urged rearward or in a direction toward the cam, that the parts may be so adjusted or spaced that the signal will operate advantageously by impact rather than by thrust.

If the spacing between the cam and the diaphragm is such that the balls contact with the diaphragm when part way up the slopes of the cam projections, the diaphragm will be actuated by positive thrusts delivered through the balls. If, however, the spacing or adjustment between the cam and the diaphragm be greater, so that the balls do not contact with the diaphragm until they have reached the crests of the projections, or if the spacing between the crests of the projections and the diaphragm be greater than the diameter of the balls, the diaphragm will be actuated by the balls acting as projectiles. With a sufficient speed of rotation or with a sufficiently high pitch on the forward sides of the cam projections, or both, the balls may be thrust entirely free of the crests of the projections.

Figs. 7 to 10 illustrate a construction very similar to the last form of the invention. Here, instead of a single ball, a plurality of balls $10^b$ occupy each guide opening or recess $12^b$ and constitute a compound thrust element. Preferably, two balls are employed in each pocket, one ball being free to roll upon stationary cam $8^b$ and the other upon the diaphragm 1, while they are also rolling on each other. The cam $8^b$ is similar to the cam $8^a$, and the head $7^b$, with its guide portion $11^b$ and guide openings $12^b$ are similar to the corresponding parts in the last form of the invention, while other parts not specifically referred to and bearing similar reference characters are similar to the corresponding parts described in the preceding construction.

In the operation of this form of the invention rotation of the ball carrier causes the balls to travel around the axis of the diaphragm one ball rolling on the cam, and the other ball rolling on the diaphragm at each contact therewith. The balls are urged rearward by centrifugal force, as in the preceding construction. If desired, the rear portions of the guide openings $12^b$, receiving the rear balls, may be substantially parallel to the axis of rotation, the forward portions of the recesses, holding the forward balls, being alone inclined outward and rearward, so that it is the forward balls which are acted upon directly by centrifugal force; but it will be obvious that all the balls are affected because the forward balls press upon the rear balls. Otherwise the operation is essentially the same as the operation in the preceding construction. Fig. 9 illustrates an adjustment or spacing in which a pronounced thrust is secured, by causing the forward balls to contact with the diaphragm when the rear balls are part way up the slopes of the cam. In Fig. 10 the spacing or adjustment is different, so that the forward balls do not contact with the diaphragm until the rear balls have almost or entirely reached the crests of the cam. With this or a slightly greater spacing, the diaphragm may be actuated mainly by the impact of the balls thrown forward by reaction with the cam.

The construction illustrated in Figs. 11 to 15 is similar to the two preceding forms of the invention. This is a construction for securing the greatest possible influence of centrifugal force for holding the rear balls in contact with the cam. To this end the portions of the pockets $12^c$ receiving the rear or cam-contacting balls are in the nature of radial bores 30. The portions of the pockets receiving the diaphragm-contacting balls may be formed at right angles thereto, as shown at 31. These two bores may be formed by a tap having a 45° tip, so that the bores are connected at the back by a 45° wall 32. In this way the unfilled space in the pocket is minimized and the action of the cam-contacting ball in crowding the diaphragm-contacting balls forward is materially assisted. In order to coöperate with the balls so arranged, the stationary cam $8^c$ is an internal peripheral cam, with its crests projecting toward the axis of rotation. Otherwise, the cam $8^c$ has functions similar to the stationary face cams $8^a$ and $8^b$; and the rotary head $7^c$ and its ball-retaining portion $11^c$ with the pockets 12, are in essential respects similar to the corresponding parts in the two preceding forms of the invention. Parts bearing the same reference characters are identical with the parts in the preceding constructions.

In operation rotation of the ball carrier causes the rear balls to travel around in contact with the internal cam, whereby these balls are forced radially inward to be pulled outward by centrifugal force. The inward forced movements of the rear balls by reaction with the walls of the pockets $12^c$ forces the other balls straight forward against the diaphragm. According to the spacing of the parts the diaphragm may be vibrated by normal thrusts or by the inertia of the balls acting as projectors as in the preceding forms of the invention.

While in any or all of the forms of the invention the diaphragm might be provided with projections or wearpieces for the reception of the thrusts or impacts of the balls, it is very desirable to construct the diaphragm as a simple disk, without perforations, projections or added weight of any kind.

It will be obvious that many of the advantages of the invention may be secured where the actuating connections are of a form other than balls.

What I claim as new is:

1. In a mechanically actuated diaphragm signal, the combination of a diaphragm, cam means, an interposed series of balls arranged to force the diaphragm at points intermediate the center and virtual periphery thereof, guides in which said balls reciprocate, and drive means for producing relative rotation between the cam means and guides.

2. In a mechanically actuated diaphragm signal, the combination of a diaphragm, cam means, an interposed series of balls arranged to force the diaphragm at points intermediate the center and virtual periphery of said diaphragm, guides in which said balls reciprocate, and drive means for rotating the cam means.

3. In a device of the class described, a diaphragm, a rotary face cam provided with a series of actuating portions, and a series of balls interposed between said cam and the diaphragm.

4. In a device of the class described, a diaphragm, a rotary face cam provided with a series of actuating portions, a series of balls interposed between said cam and the diaphragm and arranged at distributed regions, and means for guiding the balls.

5. In a device of the class described, a diaphragm, a rotary member, a face cam carried thereby, a plurality of balls interposed between the cam and diaphragm and arranged at distributed points, and guide means for said balls constructed and arranged to permit the latter to contact with the periphery of the rotary member.

6. In a device of the class described, a diaphragm, rotary cam means having a series of actuating portions, and an interposed series of balls actuated simultaneously and repeatedly by the cam means to force the diaphragm at points distributed about the center thereof.

7. In a device of the class described, a diaphragm, a series of loose reciprocatory members constructed and arranged to force the diaphragm at distributed regions intermediate the center and virtual periphery thereof, guides for said members, and rotary means constructed and arranged to cam said members simultaneously to actuate the diaphragm.

8. In a device of the class described, a diaphragm, a series of balls arranged at distributed regions between the center and virtual periphery of the diaphragm, and rotary means disposed with its axis normal to the diaphragm and constructed and arranged to cam said balls simultaneously to actuate the diaphragm.

9. In a device of the class described, a diaphragm, a series of balls arranged to force the diaphragm at distributed regions intermediate the center and virtual periphery thereof, guides for said balls, and rotary means constructed and arranged to cam said balls simultaneously to actuate the diaphragm.

10. In a device of the class described, a diaphragm supported at the periphery, camming means comprising a series of actuating portions facing the diaphragm, a series of balls interposed between said camming means and the diaphragm, guide means for the balls intermediate the diaphragm and camming means, and independent means for adjusting said camming means and guide means with respect to the diaphragm.

11. In a device of the class described, a diaphragm supported at the periphery, camming means comprising a series of actuating portions facing the diaphragm, a series of balls interposed between said camming means and the diaphragm, guide means for the balls intermediate the diaphragm and camming means, and means for adjusting the guide means relative to the diaphragm.

12. In an alarm signal of the character described, a diaphragm, a rotatable member presenting a series of cam surfaces, a plurality of intermediate thrust transmitters arranged about the center of the diaphragm and between said cam surfaces and said diaphragm and serving to bodily displace the latter while being forced by said cam surfaces, and a support for said intermediate thrust transmitters independent of the diaphragm, said thrust transmitters being hardened and free to rotate about their own axes.

13. In an alarm signal of the character described, a diaphragm, a rotor having a series of recesses in the face thereof presenting cam faces, a plurality of balls constituting intermediate thrust transmitters between said cam faces and said diaphragm and arranged about the center of the latter, and a support disposed substantially parallel to said diaphragm between said diaphragm and said rotor and having a series of pockets within which said balls are free to rotate.

14. In an alarm signal of the character described, a diaphragm, a rotor presenting a series of cam faces, a plurality of balls constituting intermediate thrust transmitters between said cam faces and said diaphragm and arranged about the center of the latter, and a support disposed substantially parallel to said diaphragm between said diaphragm and said rotor and having a series of pockets within which said balls are free to rotate, the range of bodily movement of said balls being substantially equal to the amplitude of vibration of said diaphragm.

15. A mechanical horn, embodying therein a flexible diaphragm, a rotary striker member having its axis at right angles to said diaphragm at the center of the latter, a frame between said striker member and said diaphragm and spaced away from the latter, said frame having a plurality of openings extending therethrough about the axis of said striker member, and reciprocatory impact members movably mounted in said openings and adapted to impart impulses to said diaphragm and recede with said diaphragm upon the reflex action thereof.

16. A mechanical horn, embodying therein a flexible diaphragm, a rotary striker member, a frame between said striker member and said diaphragm and spaced away from the latter, said frame having extending therethrough a series of openings, and balls slidably mounted in said openings and adapted to be engaged by said striker member, whereby said balls will be positively forced against said diaphragm to displace the latter and permitted to recede with said diaphragm upon the reflex action thereof.

17. A mechanical horn, embodying therein a flexible diaphragm, a rotary striker member, a frame between said striker member and said diaphragm and spaced away from the latter, said frame having extending therethrough a series of openings, and a ball mounted in each of said openings and projecting upon both sides of said frame, whereby a diaphragm displacing member adapted to simultaneously reciprocate and rotate is provided, and said balls are adapted to be positively forced against said diaphragm to displace the latter and to recede therewith upon the reflex action thereof.

Signed at New York city in the county of New York and State of New York, this 1st day of July A. D. 1911.

GEORGE C. DEAN.

Witnesses:
   IRVING M. OBRIEGHT,
   JAMES D. BROWN.